United States Patent [19]

Husted

[11] Patent Number: 5,052,524
[45] Date of Patent: Oct. 1, 1991

[54] WHEEL BRAKE

[76] Inventor: Royce H. Husted, 711 Lakeside Dr., Wheaton, Ill. 60187

[21] Appl. No.: 421,405

[22] Filed: Oct. 13, 1989

[51] Int. Cl.$^5$ .......................... B62L 1/00; B62L 3/00
[52] U.S. Cl. ................................. 188/24.11; 188/64; 188/77 R; 188/2 D
[58] Field of Search .................. 188/24.11, 64, 77 R, 188/77 W, 2 D, 24.12–24.22, 259, 249

[56] References Cited

U.S. PATENT DOCUMENTS

| | | | |
|---|---|---|---|
| 514,655 | 2/1894 | Kerwin | 188/77 R X |
| 545,492 | 9/1895 | Hall | 188/24.11 X |
| 610,104 | 8/1898 | Taylor | 188/77 R |
| 1,656,472 | 1/1928 | Christofferson | 188/77 R X |
| 1,857,104 | 5/1932 | Wilkinson et al. | 188/77 R |
| 3,220,514 | 11/1965 | Erickson | 188/77 R |
| 3,583,531 | 6/1971 | Besoyan | 188/77 |
| 3,828,895 | 8/1974 | Boaz | 188/77 R |
| 4,179,013 | 12/1979 | Kine | 188/26 |
| 4,487,294 | 12/1984 | Geek | 188/77 R |
| 4,558,861 | 12/1985 | Gall | 272/73 |
| 4,591,027 | 5/1986 | Takamiya | 188/24.11 |
| 4,757,881 | 7/1988 | Jonsson | 188/77 R |
| 4,882,844 | 11/1989 | Stokan | 30/381 |
| 4,896,899 | 1/1990 | Lawrence | 280/775 |

FOREIGN PATENT DOCUMENTS 2064788 8/1977 Fed. Rep. of Germany .... 188/77 R

Primary Examiner—Douglas C. Butler
Attorney, Agent, or Firm—Nicholas A. Camasto

[57] ABSTRACT

A brake assembly for a rotatable wheel in which the rim of the wheel has an integrally formed lip extending from the side thereof and forming a trough. A Kevlar TM aramid fiber jacketed cable, positioned in the trough, encircles the lip in the direction of rotation of the wheel. The cable is affixed to the frame at one end and to an operating lever at the other end. Moving the lever tensions the cable and applies a frictional load to the trough to brake the wheel. In a second embodiment, a pair of opposed lips, one on either side of the rim, increases the braking effect.

9 Claims, 4 Drawing Sheets

FIG. 6
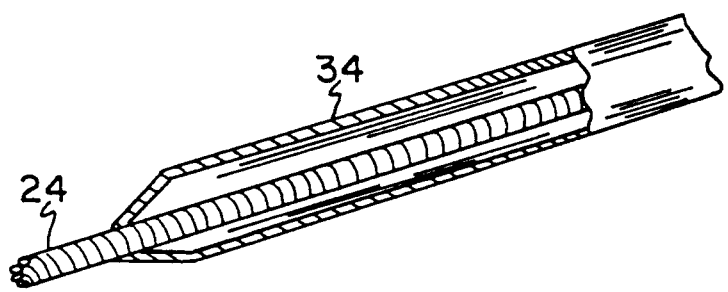
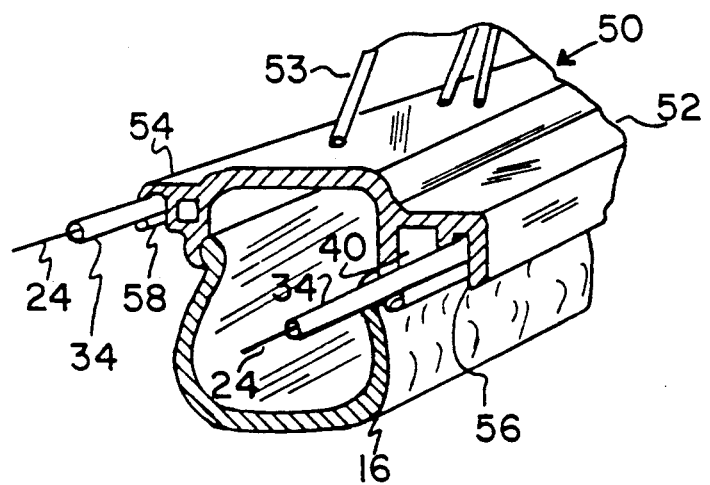
FIG. 7

5,052,524

WHEEL BRAKE

BACKGROUND OF THE INVENTION

This invention relates in general to brake systems and in particular to braking systems for vehicle wheels. The term "vehicle," as used herein, is intended to refer to bicycles, motorcycles and the like. The brake system of the invention is a replacement for conventional vehicle braking systems.

A bicycle braking system generally comprises a caliper having a pair of friction brake pads that straddle the bicycle tire for engagement with the sides of the wheel or rim. The brake is activated by a cable that closes the caliper to frictionally engage the pads with the rim. A motorcycle brake system includes one or two brake disks affixed to the wheel and which are engaged by automotive type disk brake caliper assemblies. Both brake systems are relatively complex and expensive and, particularly in the case of bicycles, difficult to maintain in proper adjustment, which is required for safe operation. The adjustment problem is severe because of the difficulty in keeping the rather delicate spoked wheels "in line," i.e. where the side of the rim lies in one plane. A "wobbly" or "out of line" wheel is very common. Such a wheel does not run "true" but moves from side to side as it rotates. Since the brake pads are adjusted outwardly to normally avoid contact with the rim, they are quite far apart for misaligned or wobbly wheels. This directly affects the actuation distance of the brake pads, making it difficult, or impossible, to obtain sufficient braking force.

Another problem with both bicycle and motorcycle brakes is their unreliable operation under adverse conditions, i.e. in the presence of contaminating materials such as water and dirt. These systems are also very inefficient from a space utilization point of view, and are not aesthetically pleasing.

The brake system of the invention incorporates a brake cable or band that applies circumferential friction loading directly to the wheel where the large surface area of the rim serves as a heat sink. The effectiveness of the heat sink is enhanced by the wheel's rotation through the air. The wheel is manufactured with one or two circumferential brake troughs or lips extending outwardly from the rim sides. Preferably a casting or an extrusion process is used. It is conventional for bicycle wheels to be extruded, formed into a loop, and subsequently cut to length and welded. With the invention the lip that forms the trough for the braking cable may be integrally formed at very little added cost. The lip is outwardly displaced from the side of the wheel sufficiently to enable the cable to clear the sides of the tire. A single lip is adequate for most applications. For heavy duty brake applications, a lip is provided on each side of the wheel. In accordance with the preferred embodiment of the invention, a bicycle brake is fabricated with a close wound steel cable that is encased over its operative braking portion in a Kevlar (TM) aramid fiber jacket for its excellent friction and wear properties. For heavy duty applications, a dual cable within a single jacket or a flat band for increasing the amount of surface friction area may be used.

One end of the braking cable is secured to the frame and wrapped around the trough in the direction of wheel rotation. The other end is tensioned by operation of a hand lever. The frictional force on the cable combines with the input force from the hand lever to effectively provide a self-energized power assisted braking action. The inventive system significantly reduces the brake lever force requirement of comparable conventional systems and provides the operator with a safer, easier to operate braking system that provides a sensitive "feel" for better brake modulation.

OBJECTS OF THE INVENTION

A principal object of the invention is to provide a novel braking system for a vehicle wheel.

Another object of the invention is to provide a brake system that is usable with vehicle wheels that are out of line.

A further object of the invention is to provide a low cost improved brake system for vehicle wheels.

Still another object of the invention is to provide a safer brake system for vehicle wheels.

BRIEF DESCRIPTION OF THE DRAWINGS

These and other objects and advantages of the invention will be apparent upon reading the following description in conjunction with the drawings, in which:

FIG. 6 is a partial view showing the preferred construction of a cable in a Kevlar (TM) aramid fiber jacket;

FIG. 7 is a partial perspective view showing a rim and braking system with two brake cables, in accordance with a further aspect of the invention;

DESCRIPTION OF THE PREFERRED EMBODIMENT

Figure 1:
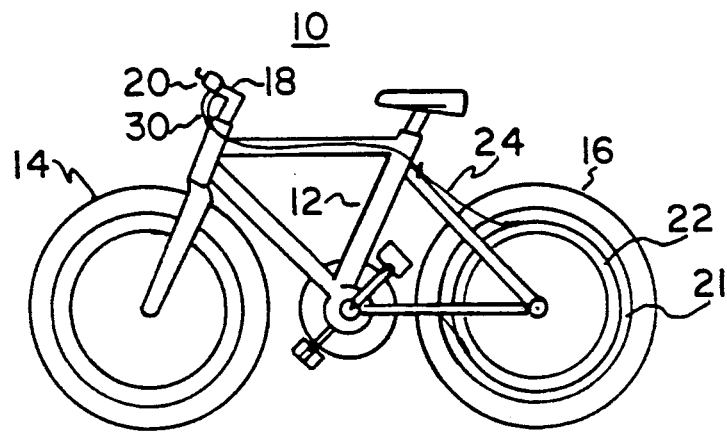
FIG. 1 is a pictorial view of a bicycle with a brake assembly constructed in accordance with the invention.

Referring to FIG. 1, a bicycle is generally indicated by reference numeral 10. The bicycle includes a conventional frame 12, a front wheel assembly including a tire 14, a rear wheel assembly including a tire 16, a neck post or stem 18 for supporting handlebars 20 and a novel rear wheel or rim 21 having a lip 22 with a brake cable 24 disposed in a circular trough formed between wheel 21 and lip 22. A protective cable sheath 30 extends to an actuating lever assembly 26 mounted on the handlebars 20.

Figure 2:
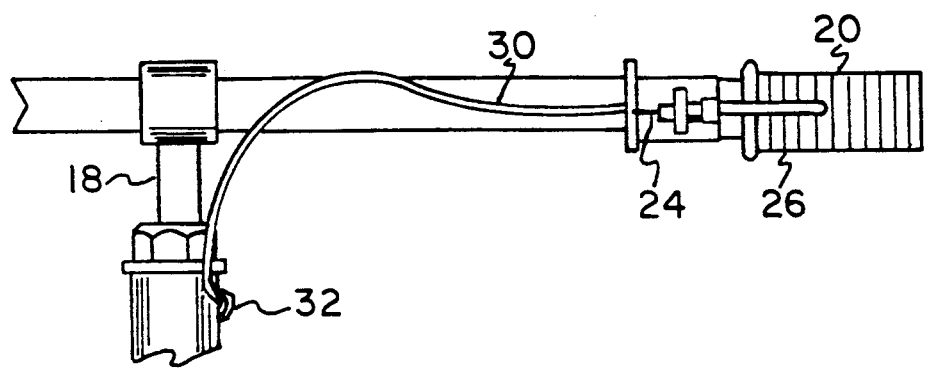
FIG. 2 is a partial front view of the handlebars of the bicycle of FIG. 1.
Figure 3:
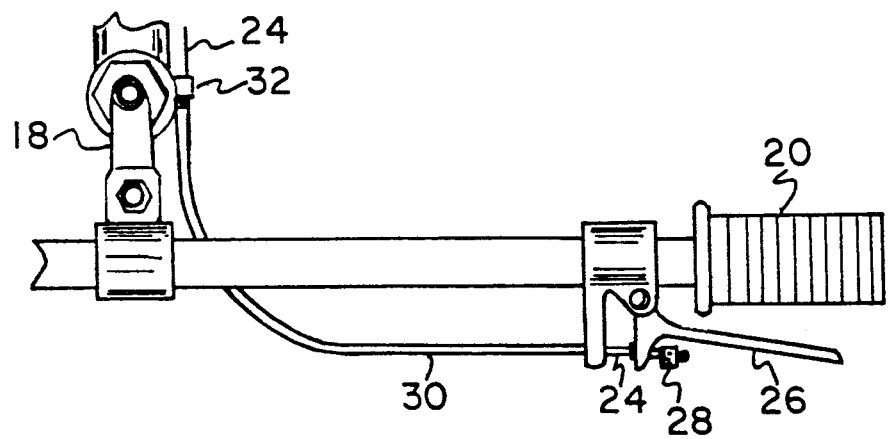
FIG. 3 is a top view of the handlebars of FIG. 2.

FIGS. 2 and 3 illustrate a conventional hand operated lever mechanism for tensioning brake cable 24 that is encased, but freely movable, within the cable sheath 30. The lever 26 extends close to the handlebars 20, enabling it to be gripped by a bicycle operator's hand for squeezing the lever toward the handlebars 20 and tensioning cable 24. When tension is applied to cable 24, it moves longitudinally within cable sheath 30, which is secured to the frame at its end point. Thus the brake cable 24 is pulled tight (since it is secured to the frame at its other end). A screw type adjustment mechanism 28, of conventional design, provides adjustment of lever travel. As mentioned, the cable sheath 30 is secured to portions of frame 12 by means, such as indicated at 32, for enabling proper feeding and tensioning of cable 24, all of which are well known in the art.

Figure 5:
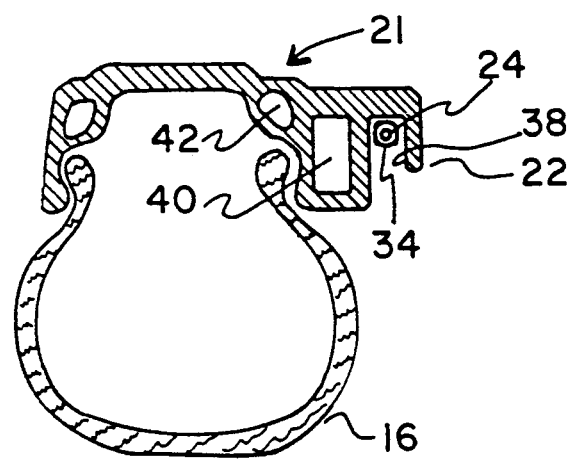
FIG. 5 is a sectional view of the wheel of FIG. 4 taken along the line 5–5.
Figure 4:
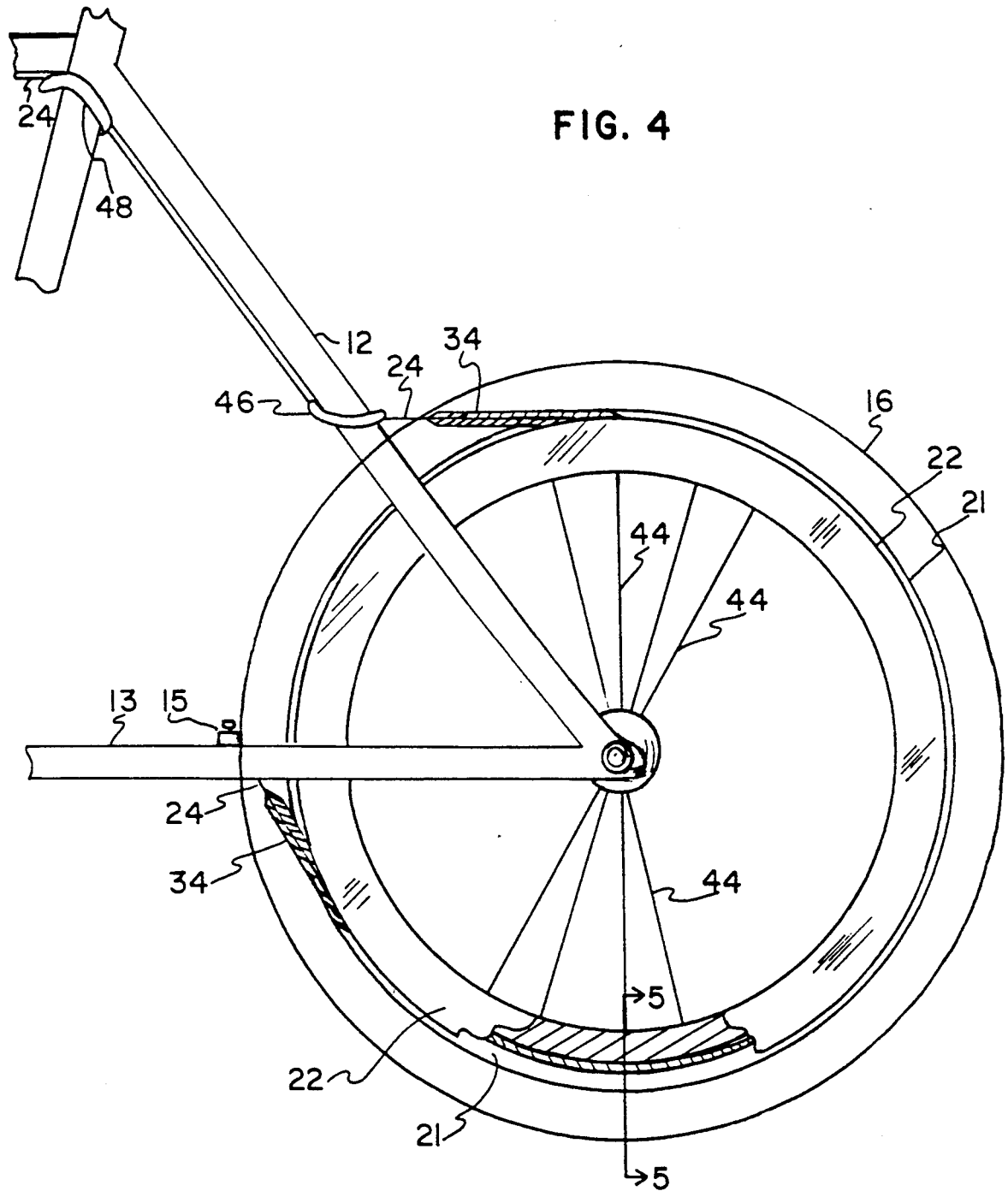
FIG. 4 is an enlarged partial view of the rear wheel of a bicycle showing the brake assembly of the invention.

In FIG. 4, a tire 16 is mounted on wheel 21 which, as is seen in FIG. 5, has a lip 22 extending therefrom. Lip 22 forms a trough 38 extending radially outward, i.e. is open at the outer circumference of the wheel 21. Brake cable 24 is surrounded by a jacket 34 in the area that encircles lip 22. The jacket 34 is positioned in trough 38. In a preferred embodiment of the invention, wheel 21 is rolled into a circle, cut to length and welded at its ends. Spokes are generally indicated by reference numeral 44. Wheel 21 may include spaces 40 and 42 for reducing its weight without compromising its strength. As best seen in FIG. 5, lip 22 extends out for a distance sufficient to assure that jacket 34 and cable 24 do not interfere with the sides of tire 16. As will be seen with reference to FIGS. 8 and 9, some motorcycle tires are particularly wide and an offset mechanical linkage system that is hinged to the frame may be needed to reach between the tire and the trough. While lip 22 need not be integrally formed with wheel 21, that construction is economical and provides other benefits such as rigidity, excellent heat transfer and smooth operation. One end of cable 24 is attached to frame 12, specifically to the lower portion 13 of frame 12 and secured in any conventional manner as indicated at 15. Guide members 46 and 48 are secured to various portions of frame 12 for appropriately guiding the brake cable 24 so that it enters trough 38 smoothly and without interference with the frame 12 or tire 16 and for otherwise keeping the cable 24 out of harm's way. 0

In FIG. 6, a partial section of close wound cable 24 is shown within a broken away section of an encircling jacket 34. As mentioned, jacket 34 is preferably made of Kevlar (TM) aramid fiber for its excellent friction and wear characteristics. The end of the jacket is secured to the cable 24 by any suitable means such as with an epoxy cement or by a conventional clamp since the jacket is only used adjacent to the brake surface.

A braking system with a single close wound steel cable of 1.2 mm diameter in a Kevlar jacket of 2.2 mm diameter was used with a 22" diameter bicycle wheel with a welded on aluminum lip forming a trough. The system is unaffected by water, mud, dirt, and other contaminants that normally cause trouble with conventional bicycle brake systems. It exhibits excellent braking characteristics with very little operator effort and shows no signs of wear despite heavy and continued usage.

FIG. 7 illustrates a wheel 50 of extruded construction with a pair of oppositely disposed lips 52 and 54 forming troughs 56 and 58, respectively. A pair of cables 24 with Kevlar (TM) aramid fiber jackets 34 are individually disposed in the troughs 56 and 58, effectively doubling the braking surface. Spokes 53 indicate the top surface of wheel 50. The construction in FIG. 7 is more suitable to motorcycle type use. It will be appreciated that flat steel straps or bands may be used in suitably shaped troughs for increasing the brake surface area. Such a construction would essentially have brake bands extending in the troughs about the wheel 50. The bands may also be encased in Kevlar (TM) type jackets for improved wear characteristics or they may comprise steel with the troughs being of steel, aluminum or a non-metallic wear surface.

Figure 9:
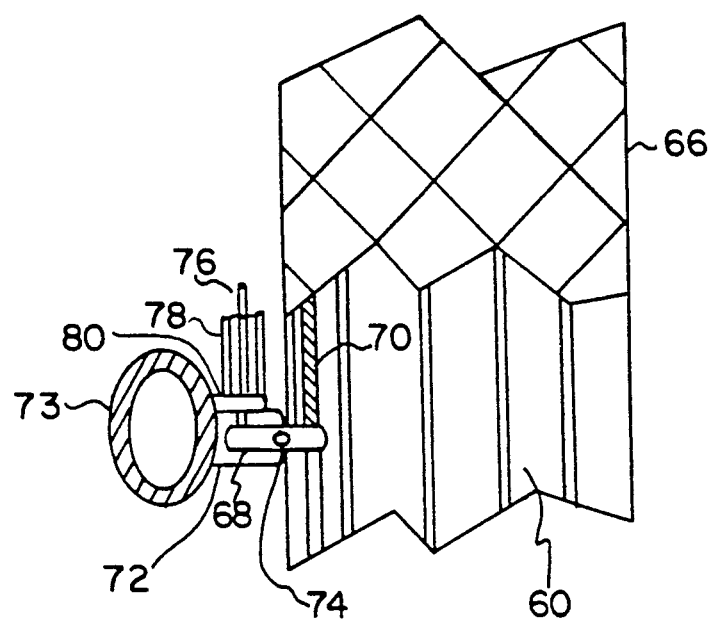
FIG. 9 is a partially broken away view along line 9—9 of FIG. 8.
Figure 8:
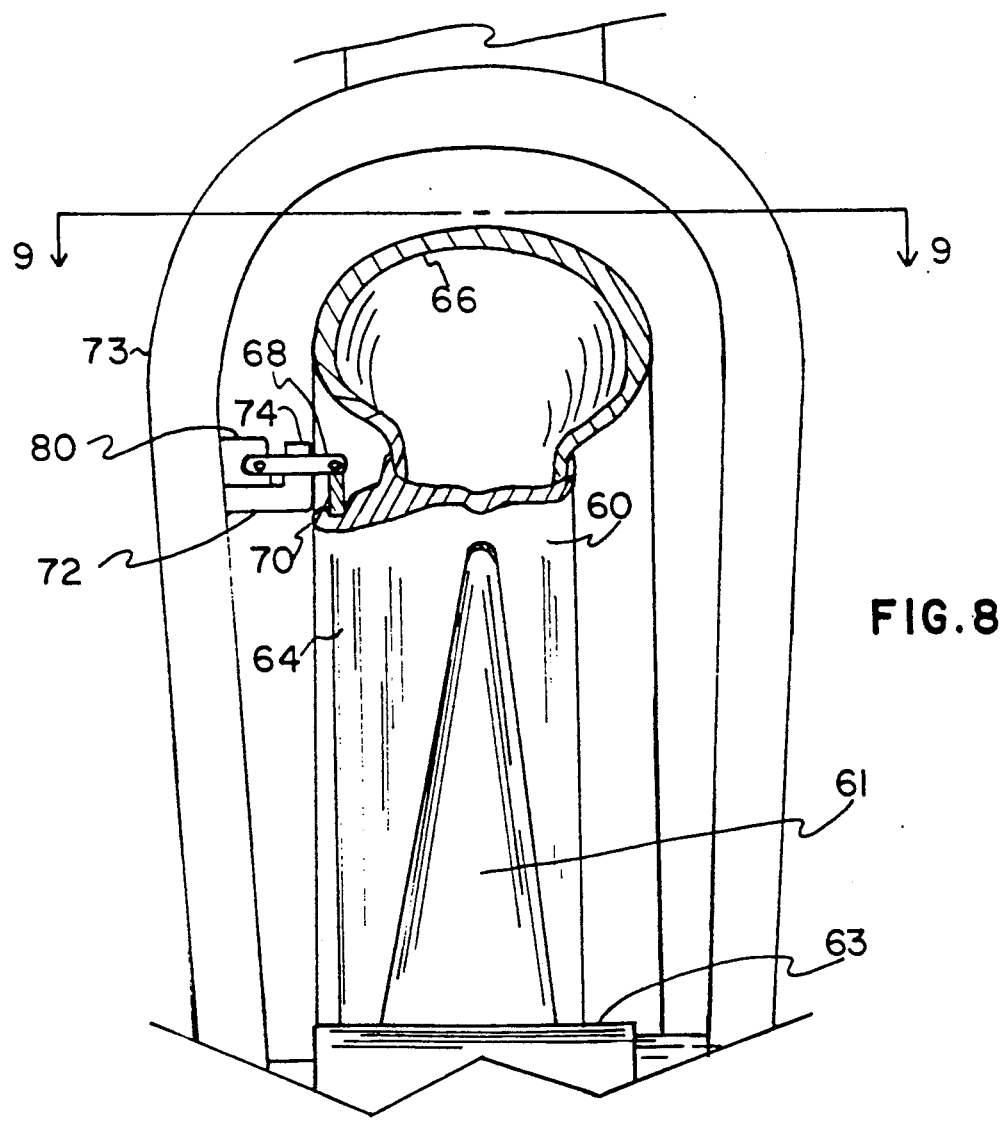
FIG. 8 is a partial view showing a lever arrangement for employing the invention with wheels having very wide tires.

The lever arrangement illustrated in FIGS. 8 and 9 may be used to apply the inventive brake system to wheels having extra wide tires as occurs in some motorcycles. A wheel 60 has a lip 64 that is radially inwardly displaced to provide greater clearance between the bottom of lip 64 and tire 66. A hub 63 including a plurality of spokes 61 complete wheel 60. The brake cable 70 is terminated to one end of a link arm 68 that is pivotally mounted by a pivot 74 to a support 72 that is attached to the bicycle frame (or fork) 73. A control cable 76 is attached to the other end of link arm 68 and connects to the operator lever (not shown). A cable sheath 78 is affixed to an L bracket 80 on support 72. Bracket 80 has an aperture (not visible) through which cable 76 freely passes. Tensioning of control cable 76 causes brake cable 70 to circumferentially apply friction braking to the trough in lip 64. The arrangement obviates the need for extending lip 64 laterally a distance sufficient to provide clearance between the brake cable and the side of the tire.

With the braking system of the invention, much greater braking efficiency and reliability under all riding conditions are attainable. This suggests that only a single rear wheel brake is required on a bicycle, adding further to cost savings and styling enhancements. More importantly, an improvement in safety is achieved since many accidents are caused by riders activating the front wheel brake without activating the rear wheel brake.

What has been described is a novel braking system for a vehicle wheel. It is recognized that numerous modifications to the invention may be made without departing from its true spirit. The invention is to be limited only as defined in the claims.

What is claimed is:

1. A brake for a wheel rotatably mounted on a frame, said wheel having an integrally formed lip adjacent its outer periphery and defining an outwardly facing trough;
   friction means including a cable in a jacket positioned in said trough and encircling at least 180 radial degrees of said lip;
   means for securing one end of said cable to said frame;
   lever means secured to said frame and to the other end of said cable for applying tension to said cable to frictionally engage said trough and said jacket; and
   said jacket encircling said lip in the direction of rotation of said wheel.

2. The brake of claim 1 wherein said jacket is made of Kevlar (TM) aramid fiber.

3. The brake of claim 1, further including:
   a tire having a sidewall extending beyond said lip; and
   linkage means pivotally mounted to said frame and interposed between said lever means and said cable, said linkage means positioned between said lip and said tire.

4. The brake of claim 3 wherein said jacket is made of Kevlar (TM) aramid fiber.

5. The brake of claim 1 further including a tire and a sidewall and wherein said wheel includes an extruded rim having said lip extending beyond said sidewall.

6. The brake of claim 5 wherein said jacket is made of Kevlar (TM) aramid fiber.

7. A brake assembly for a wheel that is rotatably mounted on a frame comprising:

a pair of integrally formed lips extending outwardly from opposite sides of said wheel and defining outwardly disposed troughs;

a pair of cables encased in frictional members respectively positioned in said troughs and encircling at least 180 radial degrees of each of said lips;

means attaching said cables to said frame at one end; and lever means coupled to said cables at their other ends for applying tension to said frictional members to frictionally load said troughs.

8. The brake of claim 7 wherein said frictional members comprise Kevlar (TM) aramid fiber jackets.

9. A brake for a wheel rotatably mounted on a frame, said wheel having a tire with a sidewall mounted on an extruded rim having an integrally formed lip adjacent its outer periphery that defines an outwardly facing trough extending beyond said sidewall;

friction means including a steel cable in a Kevlar (TM) aramid fiber jacket positioned in said trough and encircling at least 180 radial degrees of said lip;

means for securing one end of said steel cable to said frame;

lever means secured to said frame and to the other end of said steel cable for applying tension to said steel cable to frictionally engage said trough and said jacket; and said jacket encircling said lip in the direction of rotation of said wheel.

* * * * *